United States Patent [19]
Friedes

[11] Patent Number: 5,771,282
[45] Date of Patent: Jun. 23, 1998

[54] METHOD FOR BILLING MULTIPLE SERVICES ON A SINGLE ACCOUNT

[75] Inventor: Albert Friedes, East Brunswick, N.J.

[73] Assignee: AT&T Corp., Middletown, N.J.

[21] Appl. No.: 759,917

[22] Filed: Dec. 4, 1996

[51] Int. Cl.$^6$ .................................................. H04M 15/00
[52] U.S. Cl. .......................... 379/121; 379/111; 379/114; 379/126; 379/243
[58] Field of Search ............................. 379/91.01, 92.01, 379/111, 112, 113, 114, 115, 118, 127, 121, 133, 134, 144, 207, 222, 229, 242, 243, 245, 244

[56] References Cited

U.S. PATENT DOCUMENTS

| | | | |
|---|---|---|---|
| 5,381,467 | 1/1995 | Rosinski et al. ....................... | 379/121 |
| 5,521,968 | 5/1996 | Furuya et al. ......................... | 379/114 |
| 5,638,432 | 6/1997 | Wille et al. .............................. | 379/114 |
| 5,666,405 | 9/1997 | Weber ..................................... | 379/127 |

*Primary Examiner*—Curtis A. Kuntz
*Assistant Examiner*—Binh K. Tieu
*Attorney, Agent, or Firm*—Robert B. Levy

[57] ABSTRACT

Aggregated billing for calls originating from separate telephone stations (12–20) may be obtained by accessing a segmentation directory (54) upon the receipt of the call at an originating switch ($40_1$) within a telecommunications network. The segmentation directory contains a table that associates each of a plurality of common account numbers with telephone stations having telephone numbers assigned to the same subscriber. The common account associated by the segmentation directory for an incoming call is used in creation of the billing record for charges associated with the call. The charges contained in the billing records for calls associated with the common account number can be combined to yield an aggregate bill.

7 Claims, 1 Drawing Sheet

METHOD FOR BILLING MULTIPLE SERVICES ON A SINGLE ACCOUNT

TECHNICAL FIELD

This invention relates to a billing technique for telecommunications services.

BACKGROUND ART

Presently, most telecommunications service providers charge their residential, and small business subscribers for services, (e.g., long distance calls) by billing such charges to the subscriber's telephone line number. Thus, a residential subscriber having a telephone line in a year-round residence, and telephone line in a summer home, will receive two bills, one for each line. From a convenience standpoint, most subscribers prefer a single bill for telecommunications services rendered by the same provider, even if the services are rendered for separate lines at geographically separate locations.

Past billing approaches have not addressed this need. In U.S. Pat. No. 5,381,467, issued in the names of Richard Rosinski and Steven Salimando on Jan. 10, 1995, and assigned to AT&T, a billing technique is disclosed, whereby both the calling and called parties share the cost of a call in accordance with a pre-arranged cost sharing arrangement. The Rosinski et al. approach, while useful for allocating the charges between the calling and called parties, does not provide any mechanism for aggregating the charges incurred on separate lines common to a single subscriber.

Under some circumstances, very large, multi-location subscribers, such as large corporations, schools, and governmental entities enjoy an aggregate bill for telecommunications services from a single provider even when the charges are incurred in connection with calls on telephone lines at different locations. For example, subscribers of AT&T's Software Defined Network (SDN) telecommunication service enjoy aggregate billing. To accomplish such aggregate billing, calls originating from each location receiving SDN service pass to an Originating AT&T Switch (OAS) via a trunk group associated with SDN service. Upon receipt of such SDN traffic, the OAS accesses a special SDN data base to retrieve the subscriber's record. Using the information returned from the SDN data base, the switch now associates the call with the particular subscriber responsible for the charges.

While SDN service permits aggregated billing, the service is expensive, as compared with Plain Old Telephone Service (POTS). Moreover, SDN service requires extensive network capabilities, including a specific SDN database, as well as specific signaling and switch capabilities, not to mention specific Operation, Administration, Maintenance, and Provisioning (OAMP) requirements for supporting SDN service. For POTS subscribers, the above-described SDN service does not offer a good mechanism for providing aggregate billing.

BRIEF SUMMARY OF THE INVENTION

Briefly, in accordance with a preferred embodiment of the invention, a method is provided for aggregating the billing for services, including telecommunications services (e.g., long distance calls) made from telephone stations having different identifiers (e.g., different telephone numbers). Pursuant to the invention, a data base associates common account numbers with telephone identifiers for which billing is to be aggregated. When a caller at a telephone station makes a telephone call that utilizes a billed telecommunications service, the call is received at an originating switch within a telecommunications network providing the service. Upon receipt of the call, the originating switch accesses the data base to determine whether the call received at the switch originated at a telephone station having an identifier associated with a common account number. Typically, the data base determines whether the received call should be associated with a common account number by comparing the line number associated with the telephone station from which the call originated to those telephone numbers associated with common account numbers. If the telephone call originated from a telephone station whose line number is associated with a common account number, then the switch makes a billing record identifying the common account number for the charges associated with the call. All of the billing records for each common account number are aggregated to yield an aggregate bill for all telecommunications service charges associated with each common account number. Additionally, billing for other services, such as satellite television, and credit card calls associated with the common account number can be aggregated with the billing for telephone services.

DETAILED DESCRIPTION

Figure 1:
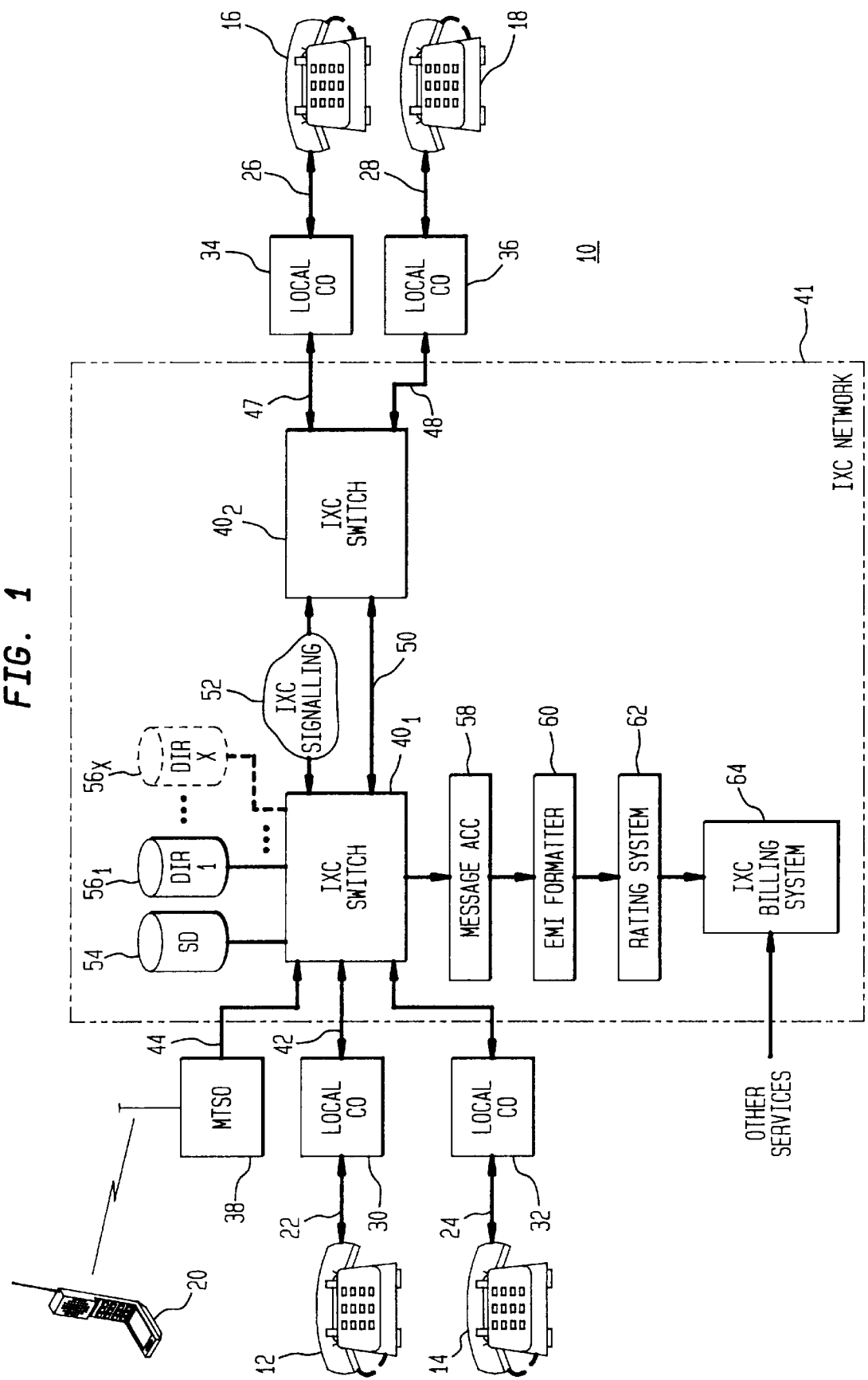
FIG. 1 depicts a block diagram of a telecommunications network for practicing the method of the invention.

FIG. 1 illustrates a telecommunication network 10 for providing telephone subscribers (represented by telephone stations 12, 14, 16, 18 and 20) with telecommunications services. In the illustrated embodiment, telephone stations 12, 14, 16, and 18 represent "wired" stations. In other words, individual telephone lines 22, 24, 26, and 28 connect telephone stations 12, 14, 16 and 18, respectively, to central offices 30, 32, 34 and 36, respectively. The central offices 30–36 provide the telephone stations 12–16, respectively, with local service (e.g., dial tone). The lines 22, 24, 26, and 28 connecting the telephone stations 12, 14, 16 and 18, respectively, have unique telephone numbers to facilitate call routing and to facilitate billing for telecommunications services. Although the telephone stations 12, 14, 16, and 18 are served by central offices 30, 32, 34 and 36, respectively, a single central office could serve more than one telephone station.

In the illustrated embodiment, telephone station 20 comprises a wireless station (e.g., a cellular or personal communications system terminal) served by a Mobile Telephone Switching Office (MTSO) 38. The MTSO 38 effectively provides the station 20 with dial tone. Each wireless telephone station 20 has a unique telephone number for call routing and billing purposes.

To enable the telephone stations 12–20 to originate and receive long distance and other telecommunications services, the central offices 30–36 and the MTSO 38 are served by one of the toll switches $40_1$–$40_n$ within an Inter-Exchange Carrier (IXC) network 41, such as the IXC network maintained by AT&T. In the illustrated embodiment, n=2. To that end, toll switch $40_1$ is linked via trunks 42, 43, and 44 to central offices 30 and 32 and MTSO 38, respectively. Trunks 47 and 48 link central offices 34 and 36, respectively, to toll switch $40_2$. The particular linkage between a central office (or MTSO) and a toll switch within the IXC network 41 depends on the distance between them. Typically, the central offices (and MTSOs) are served by the closest toll switch in the IXC network 41.

The switches $40_1$ and $40_2$ in the IXC network 41 are linked to each other by at least one voice trunk 50 and by a signaling network 52, such as AT&T's SS7 signaling network. In this way, the switches receive signaling information and can exchange voice (in-band) traffic. (Although not shown, the IXC network 41 may also include one or more via switches for routing in-band traffic between the switches $40_1$ and $40_2$.)

The switch $40_1$ is linked to a data base 54, either directly, or through a signaling or data network such as AT&T's SS7 network. The data base 54, typically referred to as a Segmentation Directory (SD), contains information indicating where the switch $40_1$ should look for information regarding the manner in which the switch should process calls. In particular, the SD 54 provides directory information to the switch $40_1$ regarding which one of several service directories $56_1$–$56_x$ (where x is an integer) should be accessed for specific call processing information. Thus, for example, if the incoming call is an 800 number call, the switch first accesses the SD 54. In response, the SD 54 informs the switch $40_1$ that a particular service directory, say directory $56_1$ is associated with 800 number calls and should be accessed for service information concerning how such calls should be processed. If the call is a 900 number call, the SD 54 would respond by advising the switch $40_1$ that another directory, say directory $56_x$, should be accessed.

Although not shown, the other originating switches in the IXC network 41, such as switch $40_2$, likewise have the capability of accessing the SD 54 (or a copy thereof), as well as the required one of the directories $56_1$–$56_x$, (or copies thereof), upon receipt of an incoming call. Thus, the SD 54 and service directories $56_1$–$56_x$ are common to the switches in the network 41, or alternatively, each originating switch may have access to a separate copy of the SD 54 and separate copies of the service directories $56_1$–$56_x$. Also, to the extent that the central offices 30–36 and the MTSO 38 are maintained by the same entity that maintains the IXC network, those offices could also access the SD 54 (or a copy thereof) directly if.

Each originating switch in the network 41, such as switch $40_1$, is coupled to a message accumulator 58 that records information about the service(s) rendered to the incoming call received at the switch. The information recorded by the message accumulator 58 includes the billing number (typically, the number of the line associated with the telephone station that originated the call), the number of the called party (the number of the line of the telephone station at which the call terminated), the length of the call, and the time at which the call was made. The billing information accumulated by the message accumulator 58 is formatted by an formatter 60 into an industry standard message format. An example of such a message format is disclosed in the aforementioned Rosinski et al. U.S. Pat. No. 5,381,467, incorporated by reference herein.

A rating system 62, typically a data processor or the like, rates the call to establish a charge for billing purposes. In rating the call, the rating system 62 considers the time of day, the call duration if the origin and end points of the call, the applicable rate, as well as any discounts to be applied to the call. The charge computed by the rating system 62 is communicated to an IXC billing system 64 that generates a bill rendered to the subscriber.

Although not shown, the IXC switch $40_2$ also has an associated message accumulator similar to the message accumulator 58. The billing information accumulated by the message accumulator associated with the IXC switch $40_1$ is formatted and rated in a manner similar to the billing information from the switch $40_1$ before receipt at the IXC billing system 64.

In the past, the IXC billing system 64 rendered bills to subscribers in accordance with the telephone number associated with the telephone station from which the call originated, or in the case of collect and third party calls, to separate telephone billing number as appropriate. Generally, there has been no mechanism within the network 10 to allow charges for calls originated at separate telephone stations receiving POTS service to be aggregated on a single bill when the stations have a common subscriber.

The present invention provides a technique for rendering an aggregate bill for calls made from separate telephone stations associated with a single same subscriber. To render such an aggregate bill, the SD 54 is modified pursuant to the invention to cross reference all identifiers (e.g., telephone numbers) common to a single subscriber to a single account number associated with that subscriber. For example, assume that a subscriber maintains a residence having a telephone number (215) 947-5555. Also assume the same subscriber has a summer home whose telephone number is (908) 949-5555. Ordinarily, the network 41 renders separate bills for each number for telecommunications services associated with calls originating from each number. However, with the SD 54 modified as discussed, the SD, when accessed by the switch $40_1$, cross-references each number to a common account number, should one exist.

Typically, the switch $40_1$ will know the number associated with the incoming call via Automatic Number Identification (ANI) provided by the associated central office. Assume that the subscriber responsible for the numbers (215) 947-5555 and (908) 949-5555 wants aggregated billing. In accordance with the invention, an appropriate common account number is entered in the SD 54 to associate all lines common to that subscriber with the common account number. Then, upon receipt of a call from either (215) 947-5555 or (908) 949-5555, the SD 54 will return the common account number associated with the subscriber to the switch $40_1$.

The IXC switch $40_1$ provides common account number in the billing message recorded by the message accumulator 58. The billing message is formatted by the formatter 60 as before, except, that the common account number is included with the billing telephone number traditionally incorporated in the formatted record. The IXC billing system 62 receives the formatted billing message, after rating by the rating system 62 in the manner previously described.

All billing messages containing charges associated with the same common account number are aggregated by the IXC billing system 64 in exactly the same way that the billing system aggregates the charges associated with a single telephone number. In this way, a subscriber having multiple lines at the same or separate locations receives an aggregate bill for all services rendered by the IXC network for calls from telephone stations common to the same subscriber.

In addition to affording a mechanism for rendering an aggregated bill for telecommunications services, the present method also allows charges for other services to be aggregated with the telecommunications charges. Assume that the subscriber, in addition to having a common account number for multiple telephone lines, has the same common account number for an unrelated service, such as DIRECT-TV, a satellite television service. Assume further that the subscriber also wants to the charges associated with such other service to be aggregated with the telecommunications bill provided by the IXC network 41. To accomplish such aggregation, the service provider providing such other services creates a billing record using the common account number as the billing identifier. Such billing information is then sent to the IXC billing system 64 for aggregation with the subscriber's telecommunications services bill. Thus, all that is necessary to accomplish such aggregation is to utilize the same common account number, as loaded in the SD 54. In the same fashion, billing information for telephone credit card calls could be aggregated by first associating a common account number with such card calls during the verification process. Thereafter, the billing information would be sent to the billing system 64 for aggregation with the other charges associated with the common account number.

The method of the invention affords the advantage that the same architecture ordinarily used to provide service can be used to provide aggregate billing, provided that the SD 54 is modified as discussed. Thus, no new equipment need be added to the network 41 to achieve aggregate billing.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for facilitating the aggregation of charges for services, including telecommunications services incurred for calls originating from telephone stations having different identifiers;

storing common account numbers in a data base in a telecommunications network, each common account number associated with a plurality of telephone identifiers common to a single subscriber;

accessing the data base for each call received at an originating switch in the telecommunications network to determine whether the call originated from a telephone station having an identifier associated with a common account number, and if so, then making a billing record associated with the common account number for telecommunications charges incurred for said call; and combining the billing records associated with each common account number to yield an aggregate bill containing charges for all calls associated with said each common account number.

2. The method according to claim 1 wherein the combining step includes the step of combining the billing records for other services associated with each common account number.

3. The method according to claim 1 wherein said identifier comprises a telephone number associated with said telephone station.

4. The method according to claim 1 wherein said other services include credit call calling services.

5. The method according to claim 1 wherein said each call originates from a wired telephone station.

6. The method according to claim 1 wherein said each call originates from a wireless telephone station.

7. The method according to claim 1 wherein the identifier is provided by Automatic Number Identification.

* * * * *